United States Patent [19]

Olgren

[11] Patent Number: 5,730,657
[45] Date of Patent: Mar. 24, 1998

[54] SHAFT COUPLING

[75] Inventor: Leland Nels Olgren, Frankenmuth, Mich.

[73] Assignee: General Motors Corporation, Detroit, Mich.

[21] Appl. No.: 821,607

[22] Filed: Mar. 20, 1997

[51] Int. Cl.$^6$ ........................................ F16D 3/18
[52] U.S. Cl. ..................... 464/157; 464/170; 464/901
[58] Field of Search ............................ 464/157, 149, 464/170, 185, 106, 901; 403/326, 329; 285/319

[56] References Cited

U.S. PATENT DOCUMENTS

| | | | |
|---|---|---|---|
| 1,040,417 | 10/1912 | Rohdes | 464/170 |
| 1,196,268 | 8/1916 | Noel . | |
| 1,298,680 | 4/1919 | Dunham | 464/170 |
| 1,429,980 | 9/1922 | Spangler . | |
| 1,656,715 | 1/1928 | Weiland . | |
| 1,791,763 | 2/1931 | Peters | 464/170 |
| 2,098,317 | 11/1937 | Staunt . | |
| 2,381,102 | 8/1945 | Boyd | 464/170 |
| 2,578,763 | 12/1951 | Trbojevich . | |
| 2,640,335 | 6/1953 | Wingquist . | |
| 4,055,185 | 10/1977 | Waldron . | |
| 4,114,400 | 9/1978 | Schlenker | 464/701 |
| 4,696,497 | 9/1987 | Schwarzensteiner | 285/319 |
| 4,721,493 | 1/1988 | Lane . | |
| 4,789,377 | 12/1988 | Hoskins | 464/157 |
| 4,947,942 | 8/1990 | Lightle et al. . | |
| 5,073,145 | 12/1991 | Ratzokwski et al. | 464/157 |
| 5,129,275 | 7/1992 | Park . | |
| 5,171,164 | 12/1992 | O'Neil et al. | 285/319 |
| 5,205,789 | 4/1993 | Falgout, Sr. | 464/157 |
| 5,215,336 | 6/1993 | Worthing | 285/319 |
| 5,281,045 | 1/1994 | Ichikawa | 403/329 |
| 5,367,548 | 11/1994 | Attix | 285/319 |
| 5,501,542 | 3/1996 | Hall, Sr. | 464/901 |
| 5,545,091 | 8/1996 | Hoskins et al. . | |
| 5,569,090 | 10/1996 | Hoskins et al. | 464/157 |

*Primary Examiner*—Eileen A. Dunn
*Attorney, Agent, or Firm*—Saul Schwartz

[57] ABSTRACT

A shaft coupling including a first gear on an end of a first shaft, a second gear on an end of a second shaft meshing with the first gear, a tubular sleeve around the meshing first and second gears, a universal thrust bearing between the tubular sleeve and the first shaft, and a self-locking linear retainer between the tubular sleeve and the second shaft. The self-locking linear retainer includes a cylindrical bushing attached to the second shaft, a plurality of windows in the tubular sleeve, and a plurality of resilient barbs on the cylindrical bushing which are flexed inward when the end of the second shaft having the second gear thereon is plugged into the tubular sleeve and which resiliently expand into the windows to prevent dislodgment of the second shaft from the tubular sleeve. The universal thrust bearing includes a spherical shoulder on the first shaft, a bearing ring seated on the spherical shoulder, an annular washer seated on a plurality of dimples on the tubular sleeve, and a spring compressed between the bearing ring and the washer which concurrently thrusts together the bearing ring and the spherical shoulder and the first and the second gears.

4 Claims, 4 Drawing Sheets

1

SHAFT COUPLING

TECHNICAL FIELD

This invention relates to articulating shaft couplings.

BACKGROUND OF THE INVENTION

U.S. Pat. No. 1,429,980 describes an articulating shaft coupling including a pair of gears on facing ends of a first shaft and a second shaft for transfer of torque throughout a range of articulation angles between the first and the second shafts and a retainer operative to prevent separation of the gears. The retainer consists of a pair of arc-shaped shells clamped together to form a cage around the meshing gears and an annular flange on the retainer seated in an annular groove in one of the shafts for linear retention of the cage. An articulating shaft coupling according to this invention is an improvement relative to the articulating shaft coupling described in the aforesaid U.S. Pat. No. 1,429,980.

SUMMARY OF THE INVENTION

This invention is a new and improved articulating shaft coupling including a first gear on an end of a first shaft, a second gear on an end of a second shaft meshing with the first gear, a tubular sleeve around the meshing first and second gears, a universal thrust bearing between the tubular sleeve and the first shaft, and a self-locking linear retainer between the tubular sleeve and the second shaft. The self-locking linear retainer includes a cylindrical bushing attached to the second shaft for linear translation as a unit therewith having a diameter calculated for close fit in the tubular sleeve, a plurality of windows in the tubular sleeve, and a plurality of resilient barbs on the cylindrical bushing which are flexed inward when the end of the second shaft having the second gear thereon is plugged into the tubular sleeve and which resiliently expand into the windows to prevent dislodgment of the second shaft from the tubular sleeve. In a preferred embodiment, the cylindrical bushing has lugs which extend inward into a groove in the second shaft and is longitudinally split for radial expansion during installation of the lugs into the groove. The universal thrust bearing includes a spherical shoulder on the first shaft, a bearing ring seated on the spherical shoulder, an annular washer seated on a plurality of dimples on the tubular sleeve, and a spring compressed between the bearing ring and the washer which concurrently thrusts together the bearing ring and the spherical shoulder and the first and the second gears.

DESCRIPTION OF THE PREFERRED EMBODIMENT

Figure 1:
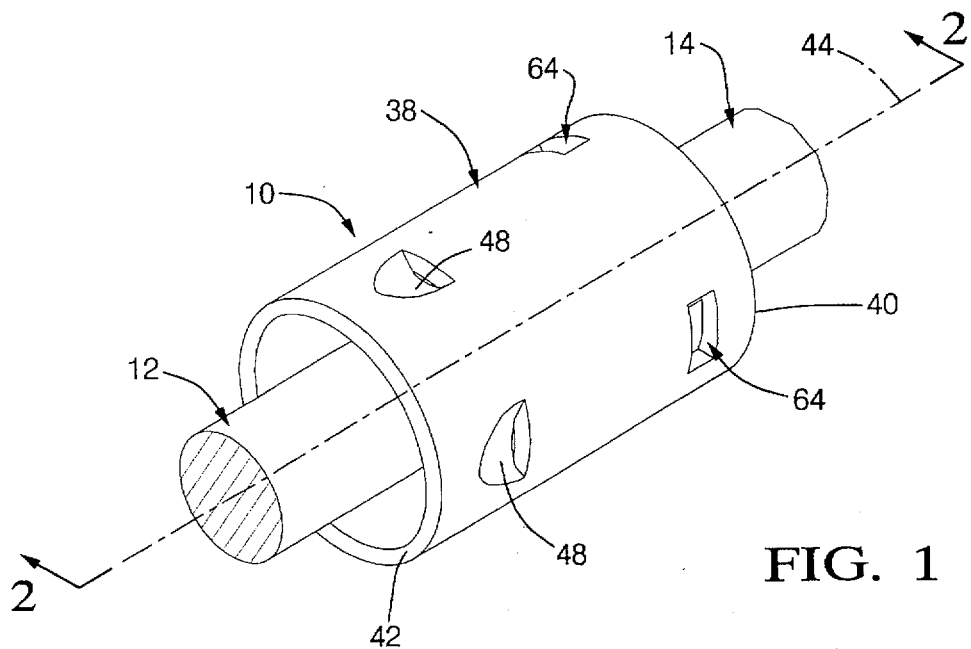
FIG. 1 is a perspective view of an articulating shaft coupling according to this invention.

Referring to FIGS. 1, 2 and 5–7, an articulating shaft coupling 10 according to this invention couples together for unitary rotation and for relative articulation a first shaft 12 and a second shaft 14. A spherical end 16 on an enlarged head 18 of the first shaft 12 faces a flat end 20 on the second shaft. A first gear 22 of the shaft coupling 10 consists of a plurality of wedge-shaped spur gear teeth 24 on the enlarged head 18 separated by a corresponding plurality of wedge-shaped troughs 26 open through the spherical end 16 of the first shaft. The gear teeth 24 and troughs 26 converge toward a concave socket 28 in the middle of spherical end 16 of the first shaft. A second gear 30 of the shaft coupling 10 consists of a plurality of wedge-shaped spur gear teeth 32 on the flat end 20 separated by a corresponding plurality of wedge-shaped troughs 34 open through the flat end 20. The gear teeth 32 and troughs 34 converge toward a convex pilot 36 in the middle of flat end 20 of the second shaft.

Mesh between the first and the second gears 22, 30 is characterized by the gear teeth 24 of the first gear seated in a respective ones of the troughs 34 between the gear teeth 32 of the second gear and vice versa with the convex pilot 36 seated in the concave socket 28. In that circumstance, the gear teeth 24, 32 cooperate in transferring torque between the first and the second shafts 12, 14 at the same time that clearance between the spherical end 16 of the first shaft and the flat end 20 of the second shaft accommodates universal articulation, i.e., articulation in any direction, of the first shaft relative to the second shaft about the coincident geometric centers of the convex socket 28 and the concave pilot 36.

As seen best in FIGS. 2–5, a tubular sleeve 38 of the shaft coupling 10 having a first end 40 and a second end 42 is disposed around the first and the second shafts 12, 14 and overlaps the first and the second gears 22, 30 in the direction of a longitudinal centerline 44 of the shaft coupling. An inside diameter dimension $D_1$ of the tubular sleeve 38 exceeds the diameters of the first shaft 12 and the second shaft 14 and the enlarged head 18 on the first shaft for unrestricted linear translation relative to the first and the second shafts in the direction of the centerline 44.

A universal thrust bearing 46 of the shaft coupling 10 includes a plurality of dimples 48 in the tubular sleeve 38 near the second end 42 thereof, an annular washer 50 in the tubular sleeve seated on the dimples, a plastic bearing ring 52, and a wave spring 54 compressed between the bearing ring and the annular washer. The universal thrust bearing 46 further includes a spherical shoulder 56 on the enlarged head 18 of the first shaft, the geometric center of which coincides with the geometric center of the spherical socket 28, and a spherical seat 58 on the bearing ring 52 facing the spherical shoulder.

A self-locking linear retainer 60 of the shaft coupling 10 includes a cylindrical bushing 62 and a plurality of windows 64 in the tubular sleeve 38. The cylindrical bushing 62 has an outside diameter dimension $D_2$, FIG. 3, corresponding substantially to inside diameter dimension $D_1$ of the tubular sleeve, i.e., calculated to achieve a close fit in the tubular sleeve 38, a plurality of integral, radially inward projecting lugs 66, and a plurality of integral, radially outward projecting resilient barbs 68. Each of the lugs 66 seats in an annular groove 70 in the second shaft 14 with a pair of side edges 72A, 72B of the lug facing a corresponding pair of side edges 74A, 74B of the annular groove whereby the cylindrical bushing is attached to the second shaft for unitary linear translation therewith in the direction of the centerline 44. Each of the barbs 68 is aligned with a respective one of the windows 64 in the tubular sleeve 38 with a distal end 76 of each barb bearing against an adjacent edge 78 of the window to prevent dislodgment of the cylindrical bushing 62 and the second shaft 14 from the first end 40 of the tubular sleeve.

Figure 2:
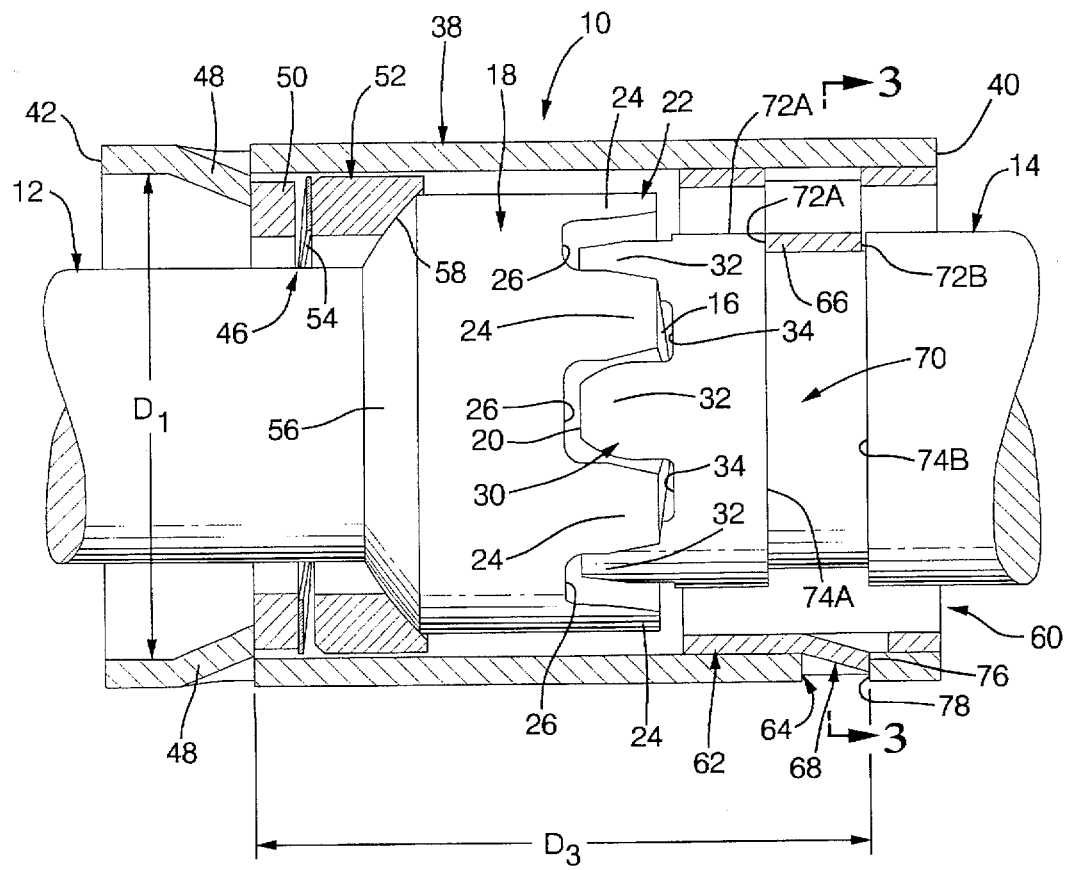
FIG. 2 is an enlarged sectional view taken generally along the plane indicated by lines 2—2 in FIG. 1.

As seen best in FIG. 2, a linear span dimension $D_3$ of the tubular sleeve 38 between the dimples 48 and the edges 78 of the windows 64 is calculated to effect linear compression of the wave spring 54 when the first and the second gears 22, 30 are in mesh. In that circumstance, the thrust of the wave spring is conducted to the first shaft 12 through the bearing ring 52 and to the second shaft 14 through the tubular sleeve 38 and the cylindrical bushing 62 whereby the first and the second gears are resiliently thrust together in the direction of the centerline 44. Likewise, the spherical seat 58 of the bearing ring 52 is thrust against the spherical shoulder 56 on the first shaft 12 and cooperates therewith in accommodating universal articulation of the first shaft relative to the tubular sleeve 38 about the geometric center of the spherical shoulder 56 through an angle of about ±5°. The cylindrical bushing 62 maintains linear alignment between the tubular sleeve and the second shaft 14.

Figure 3:
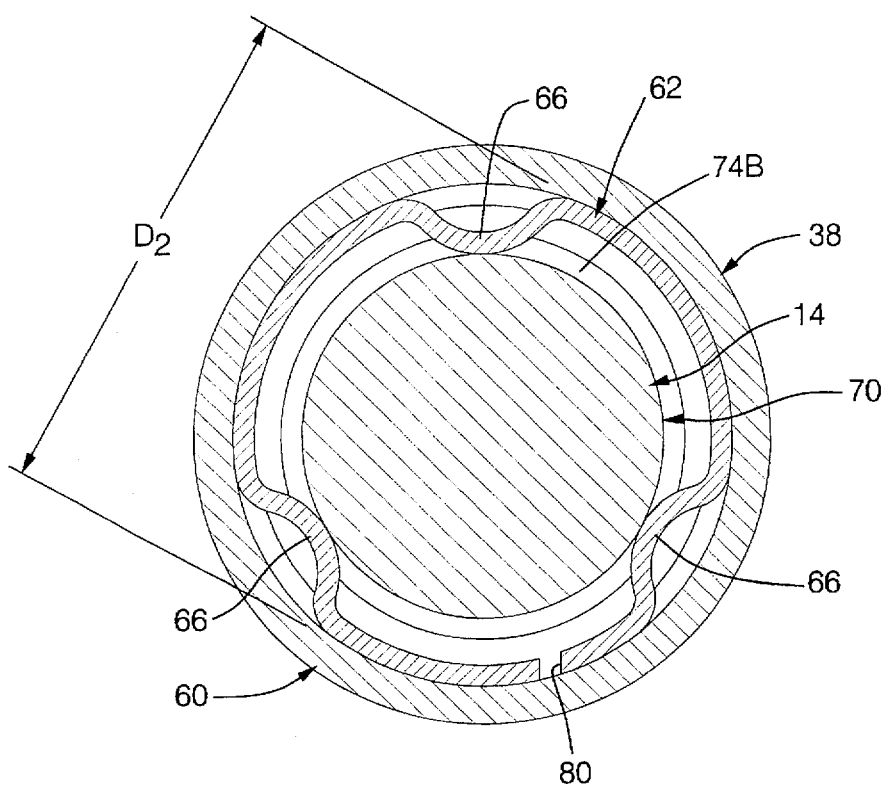
FIG. 3 is a sectional view taken generally along the plane indicated by lines 3—3 in FIG. 2.
Figure 4:
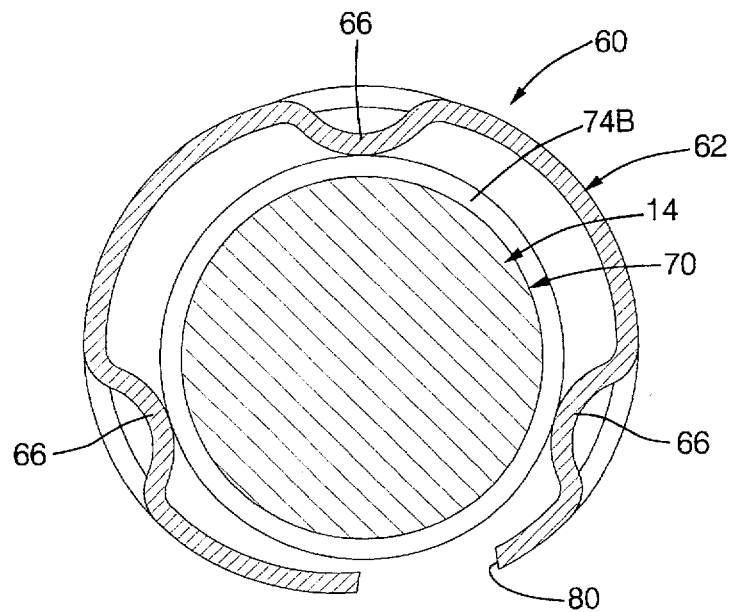
FIG. 4 is similar to FIG. 3 but showing elements of the articulating shaft coupling according to this invention in different relative positions.
Figure 5:
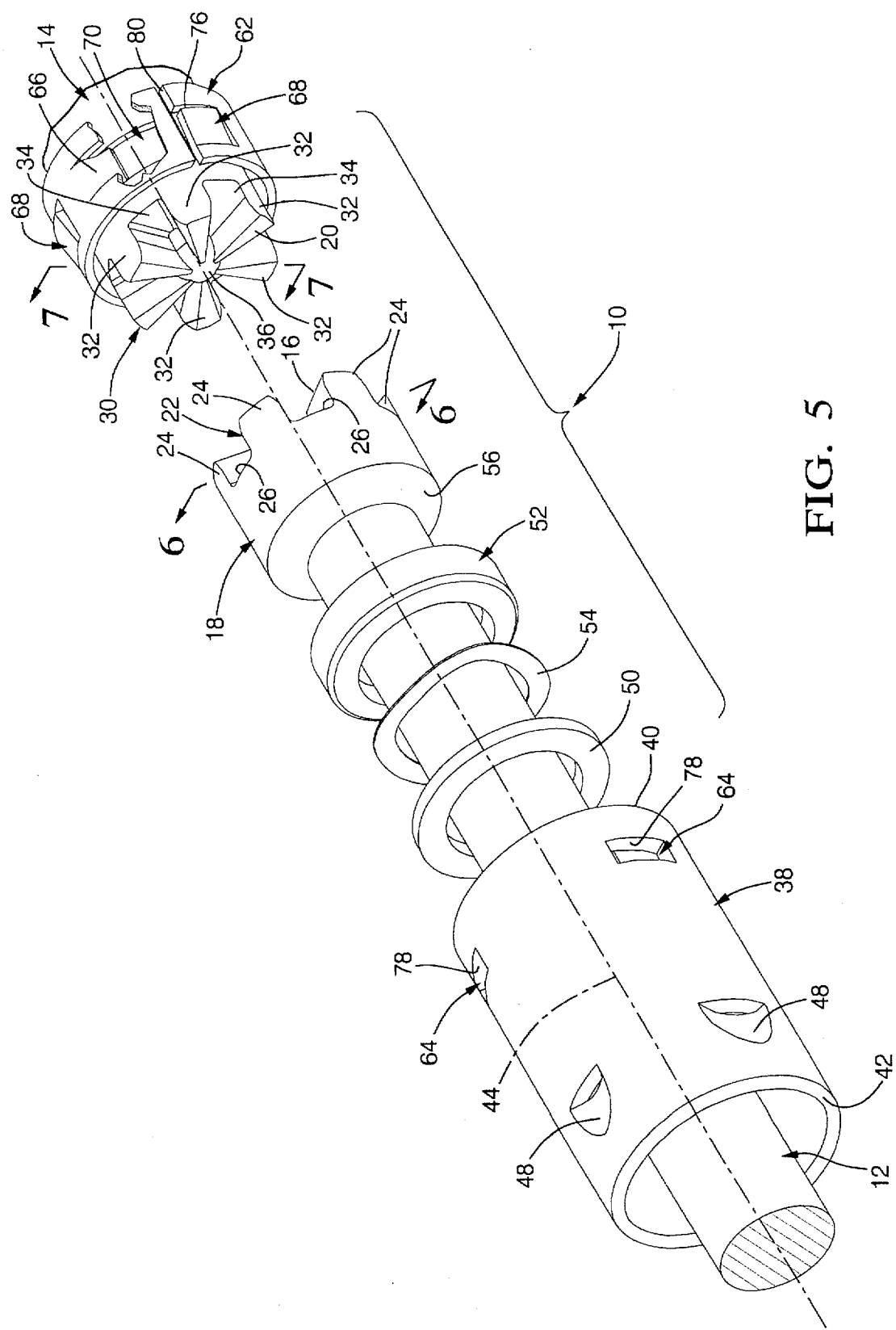
FIG. 5 is an exploded perspective view of the articulating shaft coupling according to this invention.
Figure 6:
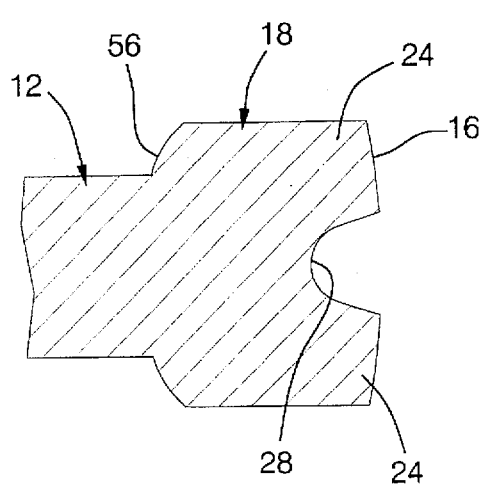
FIG. 6 is a view taken generally along the plane indicated by lines 6—6 in FIG. 5.
Figure 7:
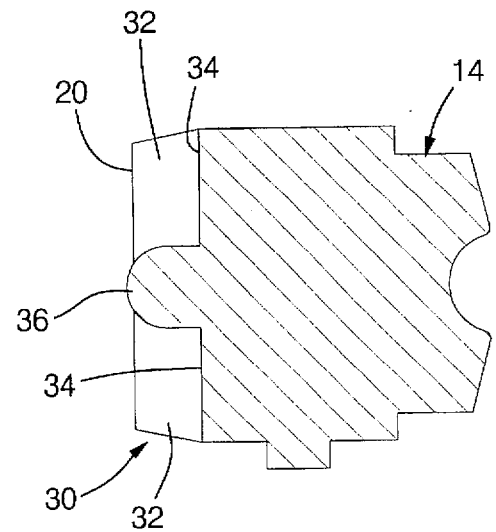
FIG. 7 is a view taken generally along the plane indicated by lines 7—7 in FIG. 5.

Referring to FIGS. 3–5, the shaft coupling 10 is assembled by inserting the annular washer 50, the wave spring 54, and the bearing ring 52 in the tubular sleeve 38 and sliding the sleeve linearly on the first shaft 12 from behind the enlarged head 18 on the latter until the bearing ring seats on the spherical shoulder 56. The cylindrical bushing 62 has a longitudinal split 80 therein which permits the bushing to be resiliently expanded, FIG. 4, to a diameter sufficient for passage of the lugs 66 over the outside of the second shaft 14 until the lugs achieve registry with and snap into the annular groove 70 in the second shaft. Thereafter, the flat end 20 of the second shaft 14 is plugged into the first end 40 of the tubular sleeve 38 until the first and the second gears 22, 30 mesh, the wave spring 54 is compressed between the annular washer 50 and the bearing ring 52, and the resilient barbs 68 snap into the windows 64 to automatically retain the second shaft in the tubular sleeve and thereby prevent separation between the first and the second gears.

Figure 8:
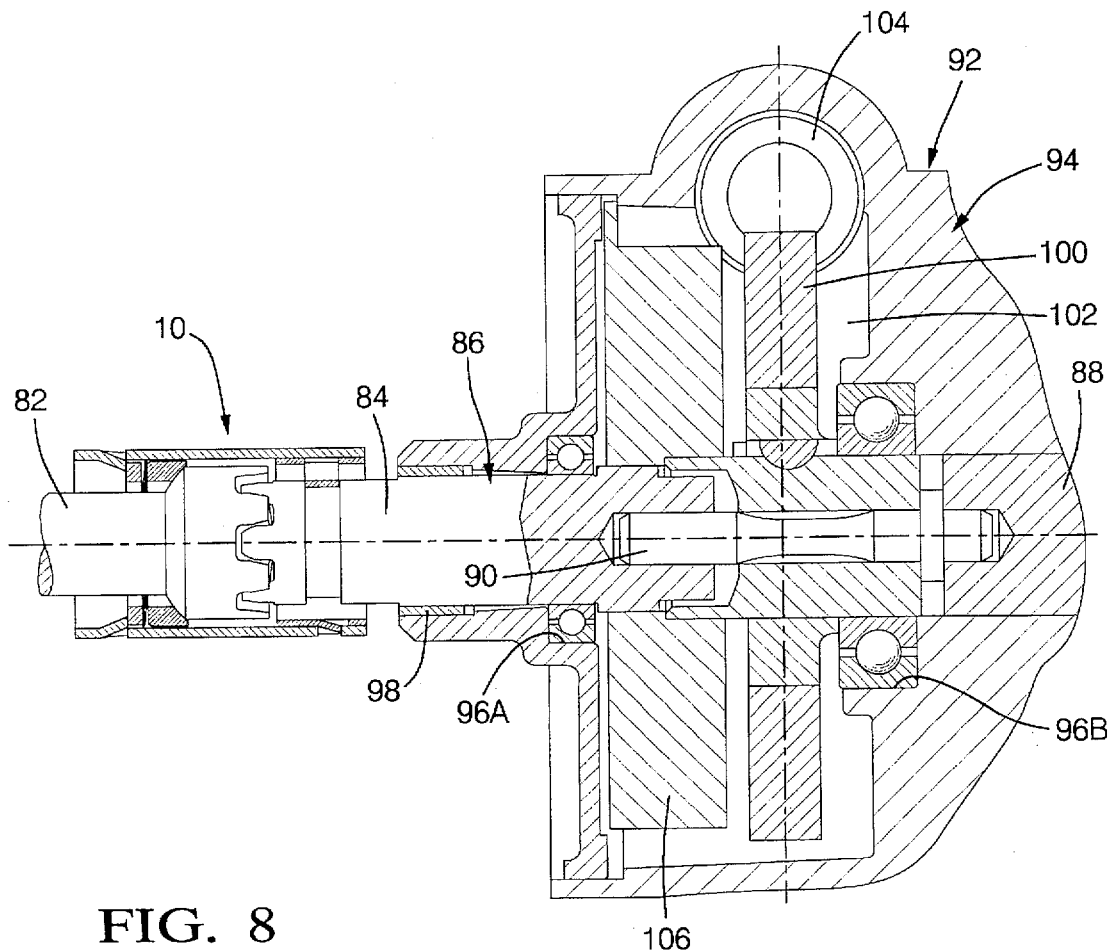
FIG. 8 is a longitudinal sectional view of the articulating shaft coupling according to this invention in a motor vehicle steering shaft application.

Referring to FIG. 8, the shaft coupling 10 according to this invention is illustrated coupling together for unitary rotation and relative universal articulation a first shaft segment 82 and a second shaft segment 84 of a motor vehicle steering shaft 86 corresponding, respectively, to the first and the second shahs 12, 14 described above. The second shaft segment 84 is connected to a third shaft segment 88 of the steering shaft 86 through a torsion bar 90. A manual steering wheel, not shown, of the motor vehicle is connected to the first shaft segment for rotation as a unit therewith. The third shaft segment is connected to dirigible wheels, not shown, of the motor vehicle through a conventional steering gear. Manual effort applied at the steering wheel is transferred to the torsion bar through the shaft segments 82, 84 and the shaft coupling 10 and twists the torsion bar against the resistance of the dirigible wheels transferred to the third shaft segment 88 through the aforesaid steering gear.

An electric power assist apparatus 92 of the motor vehicle includes a housing 94 on which the second and third shaft segments 84, 88 are rotatably supported by a pair of ball bearings 96A, 96B and a sleeve bearing 98. A worm wheel 100 is rigidly attached to the third shaft segment 88 in an internal chamber 102 of the housing 94 and meshes with a worm gear 104 connected to an output shaft, not shown, of an electric motor on the speed reducer housing. A transducer 106 in the internal chamber 102 of the speed reducer housing overlaps the second and the third shaft segments 84, 88 and produces an electronic signal corresponding to the angle of relative rotation between the second and the third shaft segments. An electronic control, not shown, turns the aforesaid electric motor on and off in accordance with signals from the transducer 106. Output torque of the electric motor is applied to the steering shaft 86 through the worm gear 104 and the worm wheel 100 to supplement manual effort applied at the aforesaid manual steering wheel.

The bearings 96A, 96B, 98 on the speed reducer housing 94 are relatively high precision bearings to minimize transducer signal error attributable to lateral runout of the shaft segments 84, 88. A bearing, not shown, between a steering column and the first shaft segment 82 remote from the speed reducer housing 94 has more manufacturing tolerance for easier assembly of the steering shaft on a steering column. The shaft coupling 10 according to this invention accommodates low angle articulation between the first and the second shaft segments 82, 84 attributable to manufacturing tolerance differences between the bearing supporting the first shaft segment 82 and the bearings supporting the second and the third shaft segments 84, 88. Importantly, the automatic retention of the second shaft segment 84 in the tubular sleeve of the shaft coupling 10 is accomplished at rates consistent with high volume motor vehicle manufacturing practices.

I claim:

1. A shaft coupling between a first shaft and a second shaft comprising:

a concave socket on an end of said first shaft, a convex pilot on an end of said second shaft seated in said concave socket so that said first shaft is connected to said second shaft for universal articulation relative thereto, a first gear on said end of said first shaft around said concave socket, a second gear on said end of said second shaft around said convex pilot meshing with said first gear for torque transfer between said first and said second shafts concurrent with relative articulation therebetween, a tubular sleeve supported on said first shaft for linear translation toward said first gear, a universal thrust bearing between said tubular sleeve and said first shaft operative to limit linear translation of said tubular sleeve to a position overlapping said end thereof and said first gear and to accommodate universal pivotal movement of said first shaft relative to said tubular sleeve, and a retention means between said second shaft and said tubular sleeve operative in response to said end of said second shaft and said second gear being plugged into said tubular sleeve to a position in which said first gear meshes with said second gear and said convex pilot seats in said concave socket to automatically prevent dislodgment of said second shaft from said tubular sleeve and to resiliently thrust said first gear and said second gear together in the direction of a longitudinal centerline of said shaft coupling.

2. The articulating shaft coupling recited in claim 1 wherein said universal thrust bearing comprises:

an annular spherical shoulder on said first shaft, a bearing ring around said first shaft having a spherical seat engaging said annular spherical shoulder on said first shaft, an annular washer around said first shaft bearing against said tubular sleeve, and a spring compressed between said annular washer and said bearing ring to thrust said tubular sleeve and said first shaft in opposite directions parallel to said longitudinal centerline of said shaft coupling.

3. The shaft coupling recited in claim 2 wherein said retention means between said second shaft and said tubular sleeve comprises:

a cylindrical bushing having a diameter substantially corresponding to a diameter of said tubular sleeve, means operative to mount said cylindrical bushing on said second shaft for linear translation as a unit with said second shaft, a plurality of windows in said tubular sleeve, and a plurality of outward projecting resilient barbs on said cylindrical bushing each flexed inward by said tubular sleeve when said end of said second shaft and said second gear are plugged into said tubular sleeve and self-biased to a position projecting into a corresponding one of said windows in said tubular sleeve for engagement on an edge thereof when said first gear meshes with said second gear and said convex pilot seats in said concave socket.

4. The shaft coupling recited in claim 3 wherein said means operative to mount said cylindrical bushing on said second shaft comprises:

an annular groove in said second shaft having a pair of side edges, a plurality of inward projecting integral lugs on said cylindrical bushing in said annular groove each having a pair of side edges facing corresponding ones of said pair of side edges of said annular groove, and a longitudinal split in said cylindrical bushing operative to permit expansion of said cylindrical bushing for insertion of said integral lugs into said annular groove.

* * * * *